United States Patent
Sherman et al.

(10) Patent No.: US 6,641,918 B1
(45) Date of Patent: Nov. 4, 2003

(54) METHOD OF PRODUCING FINE COATED TUNGSTEN CARBIDE PARTICLES

(75) Inventors: Andrew J. Sherman, Granada Hills, CA (US); Animesh Bose, Fort Worth, TX (US)

(73) Assignee: Powdermet, Inc., Sun Valley, CA (US)

( * ) Notice: Subject to any disclaimer, the term of this patent is extended or adjusted under 35 U.S.C. 154(b) by 0 days.

(21) Appl. No.: 09/583,061

(22) Filed: May 30, 2000

Related U.S. Application Data

(60) Provisional application No. 60/137,614, filed on Jun. 3, 1999.
(51) Int. Cl.$^7$ .................................................. B32B 5/16
(52) U.S. Cl. ...................... 428/403; 428/404; 428/407; 427/213; 427/214; 427/215; 427/216; 427/217; 427/251; 427/252
(58) Field of Search .............................. 428/403, 404, 428/407; 427/213, 214, 215, 216, 217, 251, 252

(56) References Cited

U.S. PATENT DOCUMENTS

| | | | |
|---|---|---|---|
| 3,879,901 A | | 4/1975 | Caveney |
| 3,920,410 A | | 11/1975 | Kunda et al. |
| 5,096,465 A | | 3/1992 | Chen et al. |
| 5,184,662 A | | 2/1993 | Quick et al. |
| 5,292,477 A | | 3/1994 | Chance et al. |
| 5,755,298 A | | 5/1998 | Langford, Jr. et al. |
| 5,876,793 A | * | 3/1999 | Sherman ................ 427/213 |
| 6,540,800 B2 | * | 4/2003 | Sherman ................ 51/309 |

* cited by examiner

Primary Examiner—Leszek Kiliman
(74) Attorney, Agent, or Firm—Bruce A. Jagger

(57) ABSTRACT

Geldhart class C tungsten carbide particles are provided with a discontinuous coating of grain growth inhibitor. Further, the fine tungsten carbide coatings are preferably provided with a continuous coating of another discreet phase material, such as, for example, a continuous coating of cobalt. Compacts produced using such materials are particularly useful as WC—Co hardmetals wherein the compacts are extremely fine grained.

13 Claims, No Drawings

METHOD OF PRODUCING FINE COATED TUNGSTEN CARBIDE PARTICLES

This application claims the benefit as Provisional application No. 60/137,614 filed Jun. 3, 1999.

FIELD OF THE INVENTION

The present invention, in general, relates to the application of various coatings to the surfaces of fine tungsten carbide particles so as to limit grain growth during the fabrication of useful articles from such particles, and otherwise improve the properties of such articles. Such composite particles are useful in fabricating better, more controllable, lower cost metal and/or ceramic parts using, for example, powder metallurgy techniques. The invention further relates to individual particles or agglomerates which have at least a second, discreet phase material, of different composition from the core tungsten carbide particles, applied to their surfaces, and to compacts made therefrom.

DESCRIPTION OF THE PRIOR ART

Tungsten carbide cutting tools are extensively used for many metal shaping and metal removal operations. Such cutting tools often take the form of tungsten carbide-cobalt (WC—Co) hardmetals. Those skilled in the art recognize that improvements in the properties of the WC—Co-based hardmetals immediately translate into improved efficiencies in the overall metal cutting and forming industries. Thus, the need for such improvements is well recognized.

A conventional method for the production of WC—Co-based hardmetals typically includes the bulk mechanical mixing of cobalt powder with tungsten carbide powder in a ball or attrition mill. The mechanical mixing is usually carried out in a liquid medium (usually volatile organic solvents) and includes the addition of lubricants such as waxes to aid in the subsequent pressing step. The mechanically mixed powders in the slurry form are usually spray dried to form agglomerated powder particles which can flow quite easily into the molds and dies used for pressing. The powders are typically pressed either in a uniaxial manner or in a cold isostatic press. Typically, the parts can be quite small (a few millimeters in thickness) to relatively large (around approximately an inch in thickness). The as-pressed green parts have lubricants in them. These lubricants are subsequently burned out using a long low temperature burnout cycle. The parts are subsequently heated to a temperature where liquid phase formation takes place and full density is achieved rapidly. The typical sintering temperature is around 1400° C. Quite often, a low pressure is applied on the parts during the liquid phase sintering step. The WC grain size inevitably grows considerably during the sintering step, and the desired contiguity between the WC grains is compromised. As a result the WC grains are larger than desired, and some WC grains are directly touching one another.

Numerous grades of WC—Co-based hardmetals are used by the metal cutting industry. The grades have varying chemistries, WC grain sizes, and different mechanical properties. One of the proposals which has been made to improve the characteristics of WC—Co hardmetals is to decrease the WC grain size. Micrograin WC—Co hardmetals with a WC grain size around 1 Micron ($\mu$m), as compared to some of the conventional carbide tools that have a WC grain size in the range of 25 to 50 microns have been proposed. It has been proposed that finer WC grain sizes might further improve the properties of the hardmetals. Submicron sized WC powders with WC particle sizes of from 0.8 to 0.2 $\mu$m have been proposed. However, there are certain limitations to this approach.

Most mechanical properties such as hardness, transverse rupture strength, and fracture toughness will be dependent on the cemented carbide's final microstructure, especially the tungsten carbide grain size, the matrix (cobalt) mean free path, and the contiguity of the tungsten carbide. The WC particles should not be touching one another. Material hardness generally increases with either finer WC grain size, or shorter cobalt mean free path. However, material strength reaches a maximum with decreasing grain size, below a certain average particle size, further grain refinement with bulk mixed materials results in a drop in material strength. This drop in the strength is generally due to increased tungsten carbide contiguity, that is, more grains are touching one another.

Other limitations of the conventional bulk processing approach, where bulk materials are milled together to achieve mixing of the WC grains with other ingredients, include non-uniform matrix distribution, segregation of light element impurities at the interfaces, and some significant grain growth that is associated with liquid phase sintering.

One of the first technical challenges that is encountered in processing submicron sized WC powders is the fact that grain growth invariably occurs during the liquid phase sintering process. Thus, the gains that are anticipated when starting with a fine WC powder are often offset by the grain growth associated with liquid phase sintering. It has been proposed to overcome this technical challenge by adding certain materials such as chromium carbide, tantalum carbide or vanadium carbide to the mixture. These additives act as grain growth inhibitors. Though the exact mechanism by which the grain growth inhibitors retard the WC grain growth during liquid phase sintering is not clear, it is postulated that the grain growth inhibitors quickly go into solution and interfere with the interfacial dissolution and reprecipitation of the WC, thus retarding the grain growth process. This expedient, by itself, limits, but does not entirely eliminate, WC grain growth. Thus, the final structure has a fine dispersion of tungsten carbide grains in which the grains are significantly larger than the starting WC grains.

Another technical hurdle is that the contiguity of the WC grains increases as the tungsten carbide grains become finer and finer. As contiguity increases, the desired mechanical properties degrade. This is a problem with bulk mixed materials that cannot be solved by conventional means, because the mean free path of the binder phase decreases with decreasing WC particle size, particularly when the materials are mechanically mixed in bulk.

Some of the other expedients that have been proposed to improve the performance of the carbide tools include the use of chemical vapor deposition or physical vapor deposition operations to deposit coatings of TiC, TiN, alumina, Ti(O, C), or the like, on conventional WC—Co-based bulk tool surfaces. For example, completed tungsten carbide tools are often coated with a hardphase such as alumina to lengthen the useful life of the tool. Also diamond like coatings have been applied to bulk tool surfaces. There is a large cost associated with the production of these surface coated cutting tools. Though these coated tools provide a tremendous benefit in the performance, the performance benefit lasts only as long as the coating is there. Once the coating has worn off, the tool cannot be easily re-sharpened and put to use. The current innovation does not deal with coating the bulk tool materials but rather with the coating of individual WC grains (several agglomerated grains may also be coated together) to attain a combination of several desired attributes.

Some of the other problems that impact on the properties of the hardmetal material are the formation of eta phase or free carbon within the structure, and the incorporation of light metal impurities at the interfaces between the particles. The performance of the carbide tool is primarily dependent on the hardness, transverse rupture strength (TRS), and fracture toughness of the material.

BRIEF SUMMARY OF THE INVENTION

The present invention relates, among other things, to a process for forming coated tungsten carbide particles, the coated tungsten carbide particles so formed, and the formation of tungsten carbide (WC) multigrain compacts from such coated particles. The surfaces of the particles are modified with one or more coatings to improve the processability, handleability, physical, chemical and/or other properties of the multigrain compacts. The coatings are applied with the objective of limiting the grain growth of WC during the formation of a multigrain compact.

By ensuring, through the pre-coating of the WC grains, that each WC grain in a compact is completely surrounded by matrix material, significantly lower cobalt content can be used without a concomitant decrease in the toughness of the carbide compact. The benefit can be especially improved if cobalt coated sub-micron sized WC powders are used, and the compact is formed at low enough temperatures that the processing is all solid state. That is, the WC grains, according to one embodiment of the invention, are never subjected to a processing temperature at which they grow rapidly. Alternatively, the WC powders can be liquid phase sintered without significant grain growth through the incorporation at the particle level of diffusion resistant layers that are so highly resistant to diffusion that they prevent or at least significantly limit micro-structural rearrangement.

According to one embodiment of the present invention, better dispersion of grain growth inhibitors is provided at the particle level. The effectiveness of the grain growth inhibition is thus significantly improved. Other hardphase materials such as, for example, TiN, TiC, Ti(N,O), alumina, and the like, that are conventionally used for coating bulk tools, are applied to the individual particles at the particle level. As a result, such other hardphase materials are incorporated throughout the microstructure of the compact itself at the grain level. The performance of the hardmetal material is thus significantly improved. The current invention provides unique coated tungsten carbide particles that afford a number of improvements in the processing of micro-grain carbides and in the resultant compacts.

Coated microgram carbides for use according to the present invention can be produced, for example, by the use of recirculating, fast fluidized bed chemical vapor deposition techniques and equipment, for example, as described in Sherman et al. U.S. Pat. No. 5,876,793. Such recirculating, fast fluidized bed chemical vapor deposition techniques and equipment are used to deposit various different materials on WC micrograms to produce a unique composite powder. When consolidated, this powder results in a unique WC—Co-based hardmetal with an exceptional combination of properties. The fluidized bed is a highly efficient solid-fluid contacting device that is well suited to coating particles, enabling numerous benefits to be achieved through more precise microstructural and compositional control of materials.

In the case of fine powders that fall in the category of Geldhart Class C type particles, surface phenomena tend to dominate their behavior. This is because of their high surface-to-volume ratio. In such cases, van der Waals, electrostatic, and surface tension forces often have a dominating effect on the properties. Handling of these particles is extremely difficult. High aspect ratios, such as found in case of fine whiskers or submicron powders, further aggravate the handling problem. Modifying such fine submicron WC particulates by micro-encapsulating them with different materials is generally very difficult. One way to overcome these problems is to fluidize these fine particles in the turbulent and fast-transport regimes, where the high gas shear forces and massive turbulence tend to nullify to a great extent the cohesive effects of the fine particulates. Another advantage of operating in the turbulent and fast-transport regime is that it allows high gas shear forces and particle collision forces to continually break up agglomerates as they form. While so fluidized the particles are microencapsulated with one or more materials using chemical vapor deposition techniques. It has been determined that operating a recirculating fluidized bed in the fast-transport operating regime (which is above the transport velocity) or in the turbulent fluidization regime enables fine particles including fine powders, whiskers, chopped fibers, and the like, to be fluidized with high product yields. WC powders in the submicron range can thus be microencapsulated.

DETAILED DESCRIPTION OF THE PREFERRED EMBODIMENTS

EXAMPLE 1

Tungsten carbide (WC) powder, which has an average particle size of about 0.8 microns, is fluidized in a recirculating fast fluidized bed CVD reactor of the type described in Sherman et al. U.S. Pat. No. 5,876,793, and provided with a coating of a grain growth inhibitor using chemical vapor deposition (CVD) procedures.

The fluidized WC powder is coated with a substoichiometric chromium carbide, which, if desired, can later be converted to stoichiometric chromium carbide by carburizing. The chromium carbide coating is formed using the decomposition of chromium carbonyl at 400° C. Using conventional CVD control parameters, the conditions of coating can be adjusted so that the deposit of substoichiometric chromium carbide varies from discreet, well bonded nuclei on the order of about 10–30 nanometers in diameter to a continuous about 10–30 nanometer thick coating. The discontinuous coating of chromium carbide allows for the fine uniform dispersion of the grain growth inhibitor on the surfaces of the individual particles, yet leaves sites available on the WC grain for direct interaction between WC and a continuous cobalt binder coating. The dispersion of the grain growth inhibitor that is afforded by this CVD process is far superior to all forms of milling at the bulk level. It has been found that coatings of grain growth inhibitors on WC particles need not be continuous to be effective. Preferably, they are not continuous.

The grain growth inhibitors, when well distributed on the surfaces of the individual grains, are only required in very small proportions (generally approximately 1 weight percent of the composite particle). The chromium carbide is uniformly distributed on and tightly adhered to the surfaces of each of the WC particles even though it is not present as a continuous coating. The uniform distribution of chromium carbide on the surface of the tungsten carbide grains allows it to effectively interfere with the interfacial dissolution and reprecipitation of the WC during sintering. Because it is uniformly distributed at the individual particle level, the amount of grain growth inhibitor that is required to limit the growth of the WC grains during sintering is minimized, and it is provided without impairing the interaction between the WC and the subsequently applied continuous cobalt coating.

The WC powder with its discontinuous coating of chromium carbide is next coated in a fast fluidized bed CVD reactor with a continuous binder phase of cobalt. The WC powders with their discontinuous coatings of grain growth inhibitor are again introduced into the fast fluidized bed CVD reactor where a continuous encapsulating coating of cobalt is applied to each of the WC particles. The cobalt coating precursor used is cobalt octacarbonyl decomposed at 160–240° C. The encapsulating coating of cobalt comprises approximately 10 weight percent of the composite particle, and it is present in the form of a continuous deposit. The cobalt coating thus micro-encapsulates each WC particle and its discontinuous coating of grain growth inhibitor. The composite WC—$Cr_3C_2$—CO particles are Geldhart class C materials. The cobalt coating can, for example, range from about 2 to as much as about 40 (preferably about 3 to 20) weight percent of the composite particle.

The submicron sized composite WC particles that have been individually sequentially coated with a preferably discontinuous grain growth inhibitor coating and a continuous binder phase are suitable for consolidation using, for example, conventional press and sinter procedures or solid state processing approaches. Very little grain growth is experienced during consolidation. The resulting useful articles have superior properties by reason of the very fine starting materials, the limited WC grain growth and low contiguity. This procedure is applicable to a wide variety of conventional grain growth inhibitors. Preferably, the coating of grain growth inhibitor is discontinuous. However, continuous coatings can be used so long as they do not impair the effectiveness of the binder coating.

EXAMPLE 2

WC particles having an average diameter of about 0.5 microns are placed in a special CVD reactor of the type described in Sherman et al. U.S. Pat. No. 5,876,793, and coated with alumina. The alumina deposit can be continuous or discontinuous depending on the deposition conditions with the preference being for a discontinuous coating. This provides another hardphase other than WC, incorporated at the individual particle level of the composite. The precursor used for coating the alumina was aluminum isopropoxide, which decomposed at 450° C. Since the alumina processing causes some decarburization of the tungsten carbide, a diffusion layer, preferably chromium carbide, is preferably applied prior to the alumina deposition. When so employed as a diffusion layer, the chromium carbide coating is preferably continuous. The chromium carbide diffusion barrier can be applied as described in Example 1. The chromium carbide coating also functions as a grain growth inhibitor. The resulting WC powder preferably comprises a WC core particle with a continuous chromium carbide coating and a discontinuous alumina hardphase coating over the chromium carbide coating. This composite powder is reintroduced into the fast fluidized bed CVD reactor for the final coating step. Cobalt, which serves as a binder phase, is applied as a final continuous coating. The cobalt precursor is cobalt octacarbonyl, and it is applied using the same deposition conditions as described in Example 1. About 10 weight percent cobalt, based on the weight of the composite, is deposited as a continuous deposition each particle. The cobalt thus micro-encapsultes each of the composite WC—$Cr_3C_2$-$Al_2O_3$—CO particles that were previously coated with a continuous grain growth inhibitor coating and a second discontinuous alumina hardphase coating. The grain growth inhibitor comprises about 1 weight percent of the composite particle. The continuous cobalt coating comprises about 15 weight percent of the composite particle. The resulting composite WC powder can be consolidated using conventional press and sinter techniques, or the like, to provide superior useful articles. Very little WC grain growth occurs during such consolidation operations. A wide variety of additional hardphase materials can be utilized alone or in combination with alumina.

EXAMPLE 3

In another embodiment, the Geldhart class C WC powder is coated with titanium carbide (TiC). Titanium carbide is a hardphase material. To do this, the WC powder is coated with titanium carbide using the decomposition of titanium 2,2 bipyridne at 200–400° C. in a recirculating fast fluidized bed CVD reactor of the type described in Sherman et al. U.S. Pat. No. 5,876,793. Equivalent deposits of TiC can be obtained, for example, by the decomposition of titanium neopentonate at 100–400° C. or the decomposition of other known organometallic titanium compounds that decompose to form titanium carbide. In this case, the titanium carbide coating can be continuous or discontinuous, depending upon the conditions of deposit as is will known in the CVD art. The titanium carbide coating can be applied under conditions such that it is titanium rich, and can be further carburized to adjust the carbon content by exposure to hydrocarbon gas at 700–1100° C. The composite WC powder coated with TiC hardphase is again introduced into the special fluidized bed CVD reactor and a continuous coating of cobalt is applied. The titanium carbide hardphase is soluble in the cobalt, so the nature of the final composite particle is not significantly dependent upon whether the TiC coating is initially continuous or discontinuous. The composite WC—TiC—Co particle comprises about 10 weight percent TiC, and about 10 weight percent cobalt. The resulting composite powder can be consolidated using conventional press and sinter process or solid state consolidation processes, or the like. Since there is no grain growth inhibitor present, the processing temperatures should be held as low as possible so as to avoid excessive grain growth. Repeating this Example so as to produce particles ranging from about 5 to 20 weight percent TiC and 5 to 20 weight percent Co results in the formation of very useful particles.

EXAMPLE 4

In another embodiment, Geldhart class C WC powder is coated with metallic tantalum in a fast fluidized bed CVD reactor of the type described in Sherman et al. U.S. Pat. No. 5,876,793. In this embodiment the tantalum is not converted into TaC at this point. TaC is a WC grain growth inhibitor as well as a hardphase material that improves the hot hardness of a composite article formed from composite particles. The tantalum coating on the WC particles is discontinuous in nature. The composite powder is next coated with metallic titanium using the fast fluidized bed reactor described above with titanium neopentonate at 100–400° C. The conditions of CVD deposition are controlled as is well known so that the titanium coating is continuous. The titanium is converted to TiC and the tantalum is converted to TaC simultaneously by exposure to hydrocarbon gas at 700–1100° C. until carburization is complete. The WC powder, now coated with TaC (grain growth inhibitor) and TiC (hardphase), is again introduced into the special fluidized bed CVD reactor and coated with a continuous coating of metallic cobalt. The TiC hardphase is soluble in the cobalt binder phase. TaC comprises about 8 weight percent, the TiC about 10 weight percent, and cobalt about 10 weight percent of the composite WC—TaC—TiC—Co particle The resulting composite powder can be consolidated by conventional press and sinter processes or solid state consolidation processes. The WC experiences very little grain growth during consolidation. Satisfactory results are achieved producing particles in which the ingredients range from about 3 to 20 weight percent TaC, from about 3 to 20 weight percent TiC, and from about 5 to 20 weight percent Co.

EXAMPLE 5

In another embodiment, the individual particles of a Geldhart class C WC powder are coated with a discontinuous coating of chromium in a fast fluidized bed CVD reactor of the type described in Sherman et al. U.S. Pat. No. 5,876,793. The chromium is later converted through carburization to chromium carbide, a grain growth inhibitor. The WC—Cr composite powder is next coated with two hardphase materials, namely, TiC and alumina. The alumina coating is applied first. The composite powder is then coated with titanium carbonitride using tetrakistriethylamino titanium. The titanium carbonitride will later be converted to TiC. The titanium is converted to TiC and the chromium is converted into chromium carbide simultaneously by carburization. The composite WC powder is now coated with chromium carbide grain growth inhibitor and two different hardphase materials, namely, TiC and alumina. This powder is again introduced into the special fluidized bed CVD reactor and coated with a continuous coating of cobalt. The titanium coating can be continuous or discontinuous as the TiC hard hardphase is soluble in the cobalt hardphase binder phase. The chromium carbide comprises about 1 weight percent, the alumina comprises about 5 weight percent, the titanium carbide comprises about 10 weight percent, and the cobalt comprises about 10 weigh percent of the WC—$Cr_3C_2$—TiC—$Al_2O_3$—Co composite particle. Conventional press and sinter processes, solid state consolidation processes or the like can consolidate the resulting composite powder. Repeating this Example to produce particles having ingredients of from about 0.1 to 5 weight percent $Cr_3C_2$, from about 1 to 15 weight percent TiC, from about 1 to 15 weight percent alumina, and from about 5 to 20 weight percent Co produces particles which are suitable for use in forming compacts with superior properties.

EXAMPLE 6

A WC powder having an average particle size of about 0.8 microns is placed into a recirculating fast fluidized bed CVD reactor, heated to 200–400° C. and fluidized. Tetrakistriethylamino titanium vapors are introduced. The titanium amino compound decomposes onto the WC particle surface to form a thin continuous film of titanium nitride. The TiN coated WC powder is further coated with a continuous coating of about 10 weight percent cobalt. The composite WC—TiN—Co powder is suitable for further processing by conventional compaction procedures into, for example, metal cutting tools or metal forming dies.

Repeating these Examples using other particle sizes of from, for example, approximately 0.1 to 100 microns or larger yields satisfactory results. However, the grain size of the WC in the finished compact reflects the size of the starting grains. Some grain growth usually occurs during consolidation. One objective of the present invention is to provide composite WC particles from which to produce finished compacts with very fine non-contiguous WC grains. The properties of the compact are thus substantially enhanced. It is, therefore, preferred to use WC particles of less than about 20 microns (most preferably, less than about 5 microns) in average diameter, and, particularly those particles that are classified as Geldhart class C materials. These materials are all very fine, however, they, by definition, are distinguished by their cohesiveness and tendency to agglomerate rather than by any specific particle size. The particles can be of different configurations, for example, from generally spherical to elongated whiskers. Preferably, both the tungsten carbide core particle and the final composite coated tungsten carbide particle are Geldhart class C materials.

Suitable grain growth inhibitors for use in these Examples include, for example, chromium carbide, vanadium carbide, tantalum carbide, niobium carbide, titanium carbide, alumina, rare earth oxides, and the like.

The minimum effective amount of grain growth inhibitor is generally approximately 1 weight percent but can vary from as little as 0.1 to 5 or more weight percent of the composite particle.

Grain growth inhibitors are generally used in about the minimum effective amount. The minimum effective amount is generally approximately 1 weight percent but can vary from as little as 0.1 to 2 or more weight percent of the composite particle. A grain growth inhibitor is effective if its presence changes a property of a compact of particles by at least about 3 percent. Preferably, grain growth inhibitors are deposited on the outer surface of the tungsten carbide particle as a discontinuous phase or coating. Continuous phases or coatings can be used, if desired. If it is found, for example, that undesirable grain growth is occurring when the composite particles are consolidated, continuous coatings can be applied. There is a risk that contiguity will increase when continuous coatings of grain growth inhibitors are employed.

Suitable diffusion barriers for use according to the present invention include, for example, rare earth oxides, alumina, titanium nitride, chromium carbide, titanium carbide, nickel diboride, molybdenum diboride, titanium diboride, niobium carbide, silicon carbide, tantalum carbide, tantalum nitride, vanadium carbide, magnesium oxide, calcium oxide, aluminum nitride, and the like.

Diffusion barriers are generally used in the minimum effective amount. The minimum effective amount is generally approximately 1 weight percent but can vary from as little as 0.1 to 5 or more weight percent of the composite particle. A diffusion barrier coating is effective if its presence changes a property of a compact of particles by at least about 3 percent. Diffusion barriers are generally continuous coatings that are employed to protect the tungsten carbide particle from being chemically or physically attacked or degraded by a subsequent coating in such a way as to degrade one or more desired characteristics of the composite.

Suitable hardphase materials for use according to the present invention include, for example, alumina, titanium nitride, titanium carbide, titanium oxide, titanium diboride, tantalum carbide, hafnium carbide, hafnium nitride, boron carbide, silicon carbide, zirconium carbide, zirconium nitride, silicon nitride, and the like.

Hardphase materials are applied to the surface of the tungsten carbide particles so as provide an additional hard material in the composite particle. Typically such hardphase materials function at least as wear modifiers. This uniform distribution of a second hardphase material throughout a compact at the particle level provides significantly improved properties, particularly in terms of wear resistance, and the like, for metal cutting and forming tools. In general, the hardphase, when employed, comprises from about 3 to 20 weight percent of the composite particle. The hardphase material is effective when its presence changes a property of a compact of particles by at least about 3 percent. The encapsulating metal coating generally encapsulates the particle and the other coatings. The encapsulating metal coating also generally serves as the outer coating that becomes the binder when the particles are formed into compacts. If desired, additional coatings can be applied over the encapsulating metal coating. The encapsulating metal coating is generally cobalt. In general the binder coating comprises from about 2 to 50, and preferably, from about 5 to 20, weight percent of the composite particle.

Grain growth inevitably occurs when compacts are sintered during the consolidation process. This problem is particularly acute when very fine particles of tungsten carbide are employed. Particles of the Geldhart class C size, when sintered without the presence of grain growth inhibitor uniformly distributed at the individual particle level, will typically grow by several hundred percent, and will exhibit substantial contiguity. Milling fine particles together with a grain growth inhibitor at the bulk level is generally ineffective when used at the same minimum weight proportions that are effective when uniformly distributed at the particle level. Milling tungsten carbide and grain growth inhibitor together at the bulk level is particularly ineffective with Geldhart class C particles. Grain growth of individually coated fine particles is generally limited according to the present invention to from less than about 5 to 50 percent.

Tungsten carbide grain contiguity is minimized according to the present invention. That is, even when sintered, contact between adjacent grains of individually coated tungsten carbide in a compact is minimized. In this way, the desirable characteristics of the resulting compact are maximized. It is particularly difficult to maintain grain separation with Geldhart class C particles, but when this is achieved the properties of the resulting compacts are very superior.

Preferably, the various coatings can be applied using chemical vapor deposition (CVD) procedures. Other coating procedures such as, for example, fused salt deposition, electroless coating, physical vapor deposition, solution reaction and precipitation, and the like, can be employed, if desired. In general, however, the results obtained using fast fluidized bed CVD reactors for Geldhart class C particles are superior to those attained with other procedures. During the application of the coatings some agglomeration of the particles is generally unavoidable. Such agglomeration is, however, very limited, and is not sufficient to impair the properties of the final compacts made from these materials.

Composite particles according to the present invention can be used, for example, to make compacts for tools or wear resistant surfaces. They can also be used as brazing rods for repairing or constructing hardfacings. Conventional hardfacing brazing rod applications involve placing the particles in a hollow tube that is then suitable for arc or oxy-fuel weld or braze applications. These composite particles also find application in thermal and/or plasma spray applications.

What has been described are preferred embodiments in which modifications and changes may be made without departing from the scope and equivalents of the accompanying claims.

What is claimed is:

1. A composite tungsten carbide particle comprising:
   a tungsten carbide core particle having an outer surface and an effective amount of a substantially uniformly distributed discontinuous coating of grain growth inhibitor on said outer surface and encapsulated within a continuous binder phase.

2. A composite tungsten carbide particle comprising:
   a tungsten carbide core particle having an outer surface and a continuous diffusion barrier coating on said outer surface of said particle and a hardphase coating different from said diffusion barrier coating over said diffusion barrier.

3. A composite tungsten carbide particle comprising:
   a tungsten carbide core particle having an outer surface and a continuous diffusion barrier-grain growth inhibitor coating on said outer surface, a hardphase coating over and different from said diffusion barrier-grain growth inhibitor coating, and a continuous encapsulating coating of cobalt.

4. A composite tungsten carbide particle comprising:
   a tungsten carbide core particle having an outer surface and a continuous diffusion barrier-grain growth inhibitor coating of tantalum carbide on said outer surface, a titanium carbide hardphase coating over said diffusion barrier-grain growth inhibitor coating, and a continuous outer coating of cobalt.

5. A Geldhart class C composite tungsten carbide particle comprising:
   a Geldhart class C tungsten carbide core particle having an outer surface and a substantially uniformly distributed discontinuous coating of an effective amount of grain growth inhibitor on said outer surface, and encapsulated within a continuous outer coating of cobalt.

6. A composite tungsten carbide particle of claim 5 wherein said continuous outer coating of cobalt comprises from about 2 to 40 weight percent of said composite particle.

7. A composite tungsten carbide particle comprising:
   a tungsten carbide core particle having an outer surface and a substantially uniformly distributed discontinuous coating of an effective amount of grain growth inhibitor and a hardphase coating on said outer surface, said grain growth inhibitor being different from said hardphase, and being encapsulated within a continuous outer coating of cobalt.

8. A Geldhart class C composite tungsten carbide particle comprising:
   a Geldhart class C tungsten carbide core particle having an outer surface and a substantially uniformly distributed discontinuous coating of an effective amount of grain growth inhibitor and a hardphase coating on said outer surface, said grain growth inhibitor being different from said hardphase, and said Geldhart class C tungsten carbide core particle grain growth inhibitor and hardphase being encapsulated within a continuous outer coating of cobalt.

9. A process of producing a composite tungsten carbide particle comprising:
   selecting a tungsten carbide core particle having an outer surface;
   applying an effective amount of a substantially uniformly distributed discontinuous coating of grain growth inhibitor to said outer surface; and
   applying a continuous coating of cobalt to said core particle.

10. A process of producing a composite tungsten carbide particle comprising:
- selecting a tungsten carbide core particle having an outer surface;
- applying a coating of at least one carbide forming metal to said outer surface of said core particle;
- carburizing said coating to form at least one metallic carbide coating on said outer surface and recovering a metal carbide coated tungsten carbide particle; and
- applying a continuous coating of cobalt to said metal carbide coated tungsten carbide particle.

11. A process of producing a composite tungsten carbide particle comprising:
- selecting a tungsten carbide core particle having an outer surface;
- applying a continuous coating of a diffusion barrier to said outer surface of said core particle;
- applying a coating of a material that is different from said diffusion barrier and is reactive with said tungsten carbide core particle and recovering a coated particle; and
- applying a continuous coating of cobalt to said coated particle.

12. A process of producing a composite tungsten carbide particle comprising:
- selecting a tungsten carbide core particle having an outer surface;
- applying an effective amount of a substantially uniformly distributed discontinuous coating of grain growth inhibitor to said outer surface;
- applying a coating of hardface material to said surface, said hardface material being different from said grain growth inhibitor and recovering a coated particle; and
- applying a continuous coating of cobalt to said coated particle.

13. A process of producing a composite tungsten carbide particle comprising:
- selecting a Geldhart class C tungsten carbide core particle having an outer surface;
- applying an effective amount of a substantially uniformly distributed discontinuous coating of grain growth inhibitor to said outer surface; and
- applying a continuous coating of cobalt to said core particle.

* * * * *